(12) United States Patent
Dardailler et al.

(10) Patent No.: US 10,114,528 B2
(45) Date of Patent: Oct. 30, 2018

(54) INTERACTOR FOR A GRAPHICAL OBJECT

(71) Applicant: INTERNATIONAL BUSINESS MACHINES CORPORATION, Armonk, NY (US)

(72) Inventors: Pascale Dardailler, Grasse (FR); Marc Durocher, La Colle sur Loup (FR); Damien A. F. Garbarino, Vallauris (FR); Phillippe Kaplan, Le Rouret (FR)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 14/187,398

(22) Filed: Feb. 24, 2014

(65) Prior Publication Data

US 2014/0258900 A1 Sep. 11, 2014

(30) Foreign Application Priority Data

Mar. 6, 2013 (GB) .................................. 1303953.2

(51) Int. Cl.
*G06F 3/0484* (2013.01)
*G06F 3/0482* (2013.01)
*G06Q 10/10* (2012.01)

(52) U.S. Cl.
CPC .......... *G06F 3/0484* (2013.01); *G06F 3/0482* (2013.01); *G06F 3/04847* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 6,331,863 B1 | 12/2001 | Meier et al. | |
| 6,972,776 B2 | 12/2005 | Davis et al. | |
| 7,526,286 B1* | 4/2009 | Allen, Jr. .......... | H04M 1/72533 455/411 |
| 2002/0112180 A1* | 8/2002 | Land ..................... | G06Q 10/10 726/26 |
| 2003/0107604 A1 | 6/2003 | Ording | |

(Continued)

FOREIGN PATENT DOCUMENTS

| | | |
|---|---|---|
| WO | 2006030055 A1 | 3/2006 |
| WO | 2011041885 A1 | 4/2011 |

OTHER PUBLICATIONS

How To Customize Nexus 7, 2012.*

(Continued)

*Primary Examiner* — Jennifer N To
*Assistant Examiner* — Beau D Spratt
(74) *Attorney, Agent, or Firm* — Law Office of Jim Boice

(57) ABSTRACT

A interactor tool, method and/or computer program for changing the properties of a graphical object comprises: an edge property detector for identifying a property controlled by a moveable edge of a selected graphical object, wherein the property adjustment may be constrained if the movement of the edge is constrained by boundary conditions; and an additional graphical control that is created and displayed for the identified property and allows adjustment of the property based on user interaction of the additional graphical control, wherein the property is no longer constrained by the boundary conditions and graphical object edge.

11 Claims, 10 Drawing Sheets

Event now lasts into next day

(56) References Cited

U.S. PATENT DOCUMENTS

| | | | |
|---|---|---|---|
| 2004/0010513 A1* | 1/2004 | Scherr | G06Q 10/10 |
| 2004/0021676 A1 | 2/2004 | Chen et al. | |
| 2004/0090470 A1* | 5/2004 | Kim | G06F 3/0481 |
| | | | 715/846 |
| 2005/0039142 A1* | 2/2005 | Jalon | G06Q 10/109 |
| | | | 715/823 |
| 2005/0091596 A1* | 4/2005 | Anthony | G06F 3/04815 |
| | | | 715/712 |
| 2007/0168892 A1* | 7/2007 | Brush | G06Q 10/109 |
| | | | 715/751 |
| 2008/0229024 A1* | 9/2008 | Plamondon | H04L 67/28 |
| | | | 711/126 |
| 2009/0002324 A1 | 1/2009 | Harbeson et al. | |
| 2011/0113363 A1* | 5/2011 | Hunt | G06F 3/0481 |
| | | | 715/800 |
| 2011/0167382 A1 | 7/2011 | Van Os | |
| 2012/0147033 A1 | 6/2012 | Singhal | |
| 2012/0236201 A1* | 9/2012 | Larsen | H04N 21/235 |
| | | | 348/468 |
| 2012/0249435 A1 | 10/2012 | Nahm | |
| 2013/0036369 A1* | 2/2013 | Mitchell | G06Q 50/00 |
| | | | 715/753 |
| 2013/0086121 A1* | 4/2013 | Preslan | G06F 17/30091 |
| | | | 707/797 |
| 2013/0239049 A1* | 9/2013 | Perrodin | G06F 3/0481 |
| | | | 715/800 |
| 2013/0293469 A1* | 11/2013 | Hakoda | G06F 3/048 |
| | | | 345/158 |
| 2014/0059487 A1* | 2/2014 | Baumann | G06F 3/0482 |
| | | | 715/811 |
| 2014/0237020 A1* | 8/2014 | Schachtel | H04L 67/02 |
| | | | 709/203 |
| 2014/0282166 A1* | 9/2014 | Temkin | G06F 3/04845 |
| | | | 715/769 |
| 2015/0178690 A1* | 6/2015 | May | G06Q 10/1095 |
| | | | 705/7.19 |

OTHER PUBLICATIONS

Windows 8 Review, 2012.*
Holo Launcher, 2012.*
DayPilot "How to Set Up Overnight Shift Scheduling with DayPilot Calendar" 2011.*
UK Intellectual Property Office, Search Report for GB Application No. 13039532, dated Sep. 6, 2013.

* cited by examiner

Interactor Tool 200

- Edge property detector 202
- Interactor Method 300
- Interactor Widget 400

FIG. 2

Cannot resize event object after 8pm mouse cursor hovers over sensitive area to adjust event property Event now lasts into next day Validate the change

| 2012 | Mon | Tue | Wed | Thu | Fri | Sat | Sun |
|------|-----|-----|-----|-----|-----|-----|-----|
| 9am  |     |     |     |     |     |     |     |
| 10am |     |     |     |     |     |     |     |
| 11am |     |     |     |     |     |     |     |
| 12am |     |     |     |     |     |     |     |
| 1pm  |     |     |     |     |     |     |     |
| 2pm  |     |     |     |     |     |     |     |
| 3pm  |     |     |     |     |     |     |     |
| 4pm  |     |     |     |     |     |     |     |
| 5pm  |     |     |     |     |     |     |     |
| 6pm  |     |     |     |     |     |     |     |
| 7pm  |     |     |     |     |     |     |     |
| 8pm  |     |     |     |     |     |     |     |

10am Sat

11am Sun

FIG. 5F

INTERACTOR FOR A GRAPHICAL OBJECT

This application is based on and claims the benefit of priority from United Kingdom (GB) Patent Application 1303953.2, filed on Mar. 6, 2013, and herein incorporated by reference in its entirety.

BACKGROUND

This invention relates to a method and apparatus for an interactor for a graphical object. In particular the invention relates to a method and apparatus for editing a property associated with a hidden edge of a graphical object in graphical user interface.

The application domain is usability and interactive resizing of a graphical object when, for instance, the graphical object is not entirely visible on a graphical user interface.

Known prior art discloses a method for viewing larger than screen size digital content.

Other known prior art discloses a method to automatically resize a window in a graphical user interface.

Other known prior art discloses a method for handling and scrolling of content on screen.

Other known prior art discloses a method for scrolling content using a screen pointing device.

Other known prior art discloses a method for scrolling a view.

The above solutions generally allow expansion of a graphical object within the limits of a graphical user interface but are otherwise constrained. Such constraints can lead to frustration when the object is very large and loss of context when resizing.

SUMMARY

A method, system, and/or computer program product change a graphical object property in a graphical user interface. A selection of a graphical object is received. An identification is made of a property that is adjusted by a moveable edge of the graphical object, where the property adjustment is initially constrained by the graphical user interface. An additional graphical control for the identified property is created and displayed. The identified property is adjusted based on a user interaction with the additional graphical control, where the identified property is no longer constrained by the graphical user interface.

BRIEF DESCRIPTION OF THE SEVERAL VIEWS OF THE DRAWINGS

Preferred embodiments of the present invention will now be described, by way of example only, with reference to the following drawings in which:

FIG. 2 is a component diagram of the preferred embodiment;

FIG. 5*a* to FIG. 5*f* depict example screens showing the initial and final states of a graphical user interface and the preferred embodiment.

DETAILED DESCRIPTION

Figure 1:
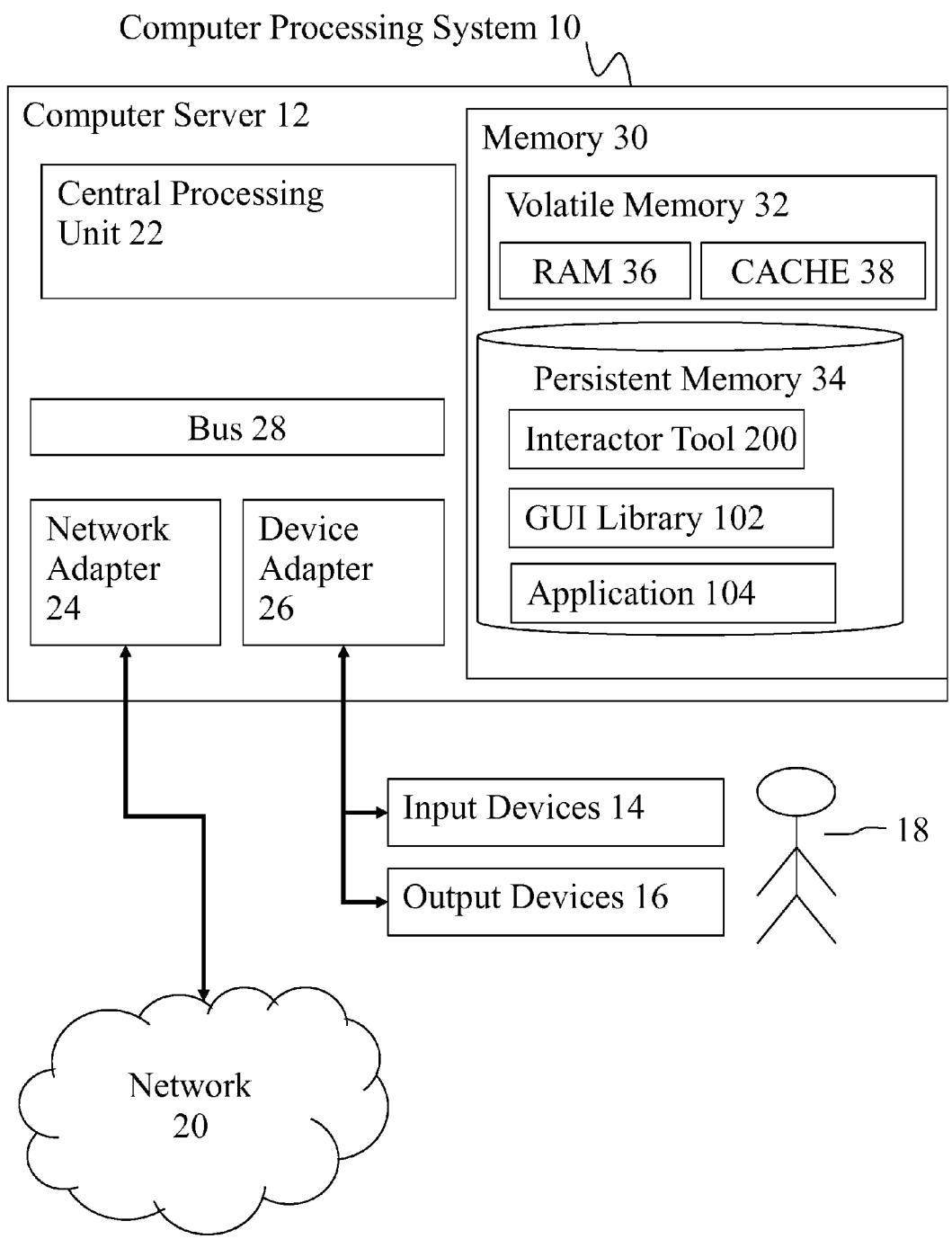
FIG. 1 is a deployment diagram of the preferred embodiment.

Referring to FIG. 1, the deployment of a preferred embodiment in computer processing system 10 is described.

Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: interactor tool 200; GUI library 102; and application 104. Further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Interactor tool 200 is described in more detail below with reference to FIG. 2.

Graphical user interface (GUI) library 102 is a library of graphical user interface code that provides primary control for objects in a graphical user interface.

Application 104 is a computer program application that uses GUI library 102 in order to operate. The preferred example is a calendar application but any graphical applications could benefit from the embodiments. Another example of an application that would benefit from the embodiments is a spreadsheet application.

Referring to FIG. 2 interactor tool 200 comprises: edge property detector 202; interactor method 300; and interactor widget 400.

Edge property detector 202 is for detecting properties that are associated with edges on a selected graphical user object and in the preferred embodiment a property that is associated with a selected edge. When an edge of a graphical user object is moved then a property associated with that edge is adjusted. For example, a box that represents time boundaries in a graphical array calendar could have an edge moved to adjust the time boundaries.

Figure 3:
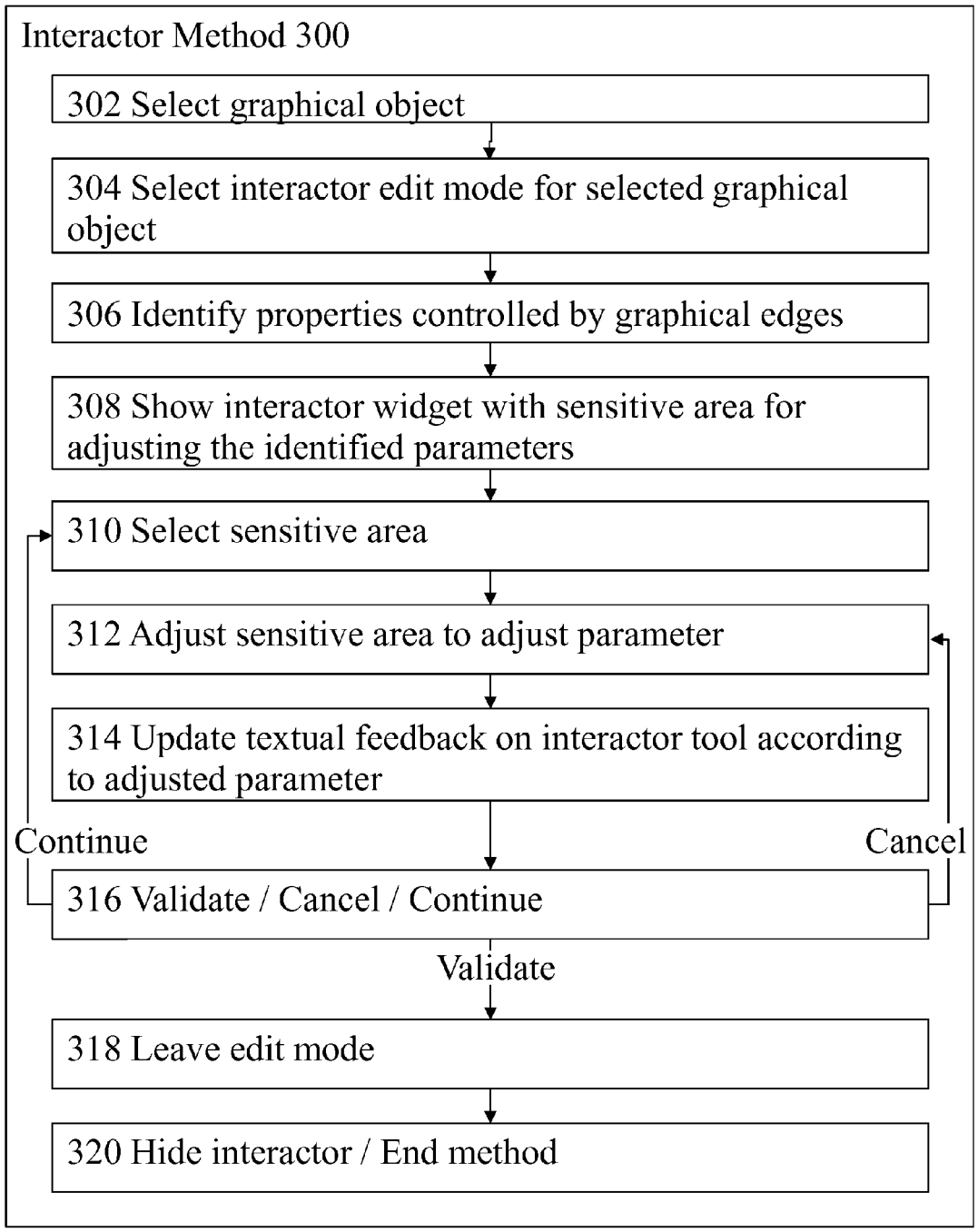
FIG. 3 is a flow diagram of a process of the preferred embodiment.

Interactor method 300 is for controlling interactor tool 200 and is described in more detail with respect to FIG. 3.

Figure 4:
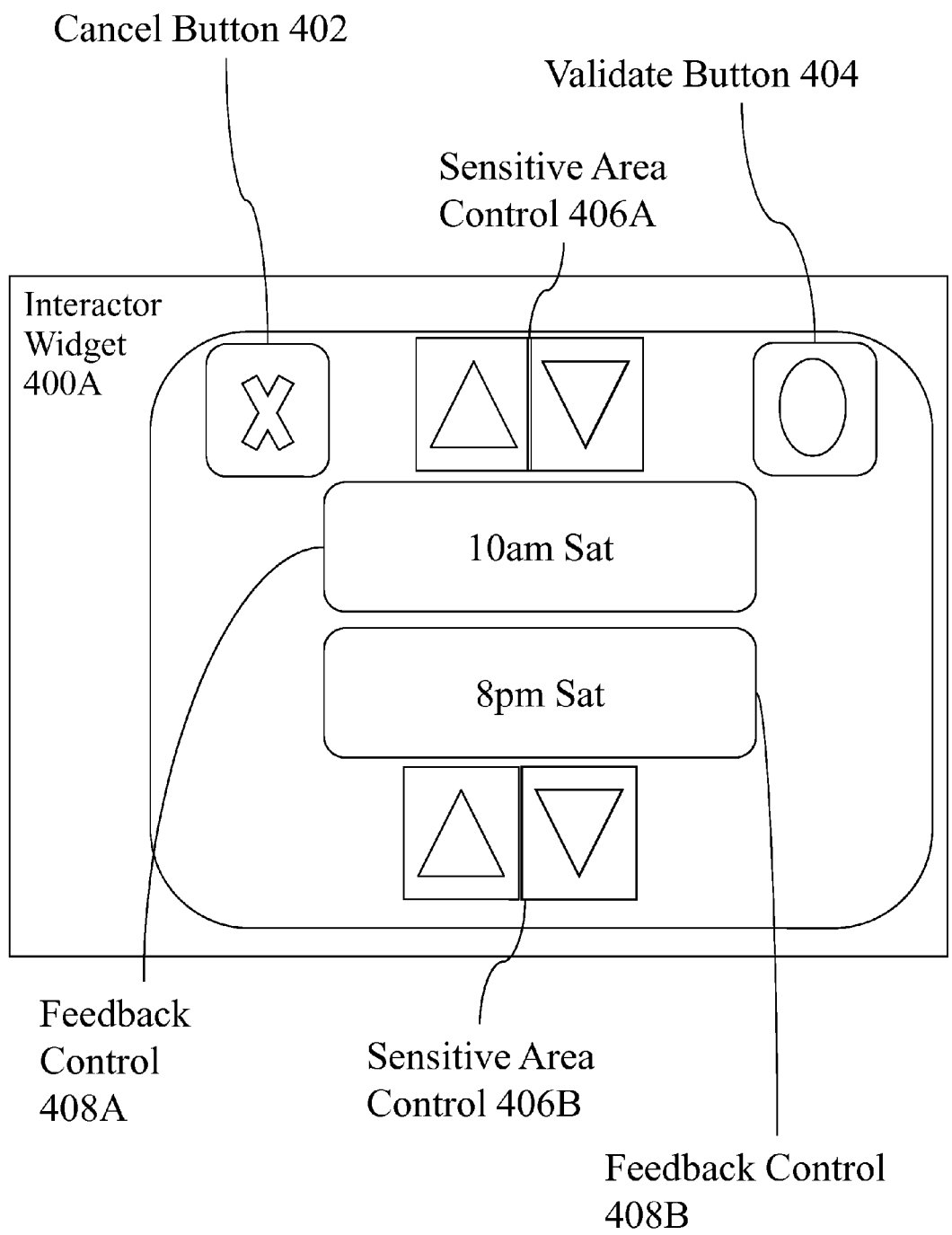
FIG. 4 is an example diagram of an interactor widget of the preferred embodiment.

Interactor widget 400 is a graphical interface that comprises additional graphical controls and feedback for a graphical object in the GUI and is described in more detail with respect to FIG. 4.

Referring to FIG. 3, interactor method 300 comprises sequential logical process steps 302 to 320.

Step 302 is for enabling selection of a graphical object on a graphical user interface. Typically this happens when a user moves a mouse cursor over a graphical object and presses the select button; this user action translates to an event generated for the mouse cursor at the position over the graphical object on the screen. The event is recorded by interactor method 300.

Step 304 is for enabling selection of an interactor edit mode for the selected graphical object. Typically this is achieved when a user selects an interactor edit mode option from a context menu associated with the graphical object. This user action translates to an event that is recorded by interactor method 300 and initiates step 306.

Step 306 is for identifying properties that are controlled by the edges of the selected graphical object. In the preferred embodiment all edges are considered and all associated properties identified. The example of FIG. 4 shows two properties but more could be identified. In other embodiments, there could be a user step of selecting edges that are considered for associated properties. Once the properties are identified then step 308.

Step 308 is for displaying interactor widget 400 comprising interactor sensitive area controls for each identified property and respective interactor text feedback controls.

Step 310 is for enabling selection of the interactor sensitive area controls. Typically the user will move the mouse cursor to the control and select it to generate control events.

Step 312 is for adjusting the associated property of the control events generated by the selection of the interactor sensitive area control.

Step 314 is for updating the feedback control based on the adjusted property.

Step 316 is for enabling a confirmation or cancel control or allowing the adjustment of interactor tool 200 to continue. Until the confirmation or cancel control are selected then the process repeats from step 310. If the user selects continue then step 318. If the user selects cancel then step 312 and the property is reset to the original value.

Step 318 is for leaving the edit mode.

Step 320 is for removing the interactor widget 400 from the graphical display and for ending interactor method 300.

Referring to FIG. 4, interactor widget 400 comprises: cancel button 402; validate button 404; interactor sensitive area control 406a and 406b; interactor feedback control 408a and 408b.

Cancel button 402 is for sending an event when selected to reset any adjustments to the properties to the original values.

Validate button 404 is for sending an event when selected to confirm any adjustments to the properties.

Interactor sensitive area control 406a (and 406b) is a control that provides increase events and decrease events when selected by a user for an associated property.

Interactor feedback controls 408a and 408b are controls that update text or graphical representation of the associated property. In the figure, the text values are time date values from a calendar object that can be increased or decreased according to user selection of a respective interactor sensitive area control.

Referring to FIG. 5a to FIG. 5f, different states of an example graphical user interface are described. The example comprises a calendar grid interface 500 with a graphical event object 502 superimposed. The calendar grid comprises days of the week along a horizontal axis and times along a vertical axis.

Figure 5A:
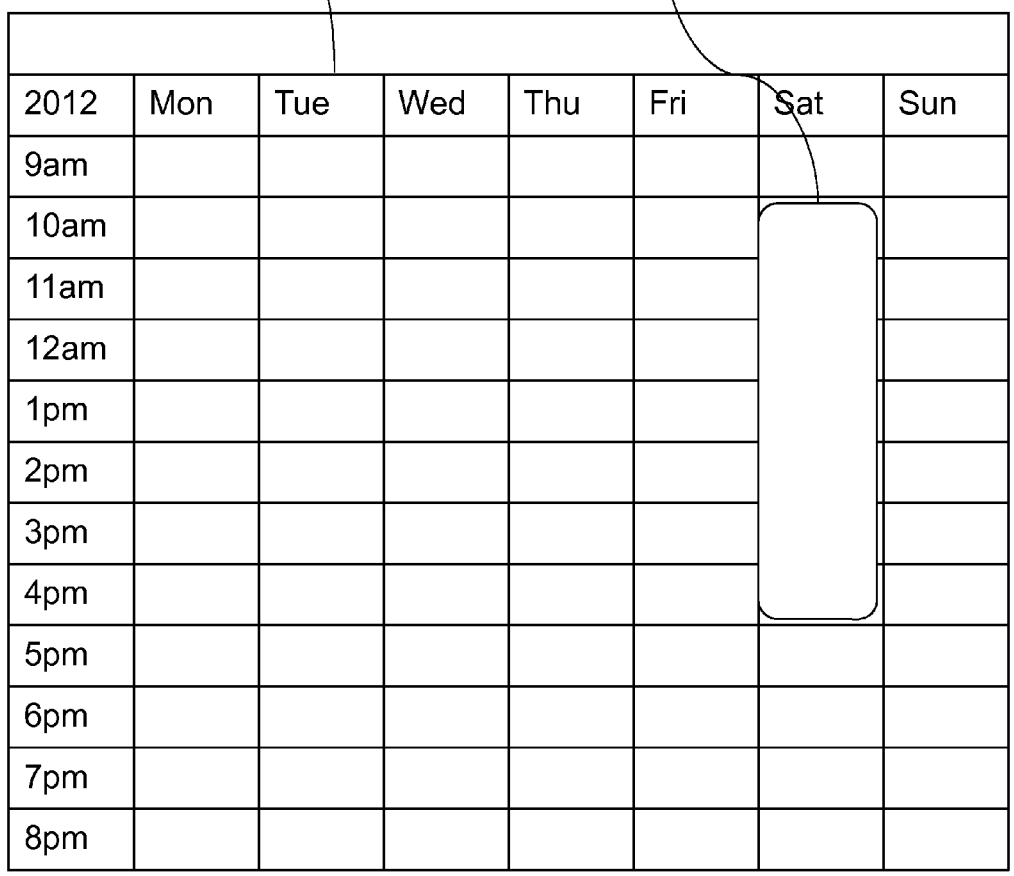

Referring to FIG. 5a, graphical event object 502 represents an appointment that extends from 10 am Saturday to 5 pm Saturday on the calendar grid.

Figure 5B:
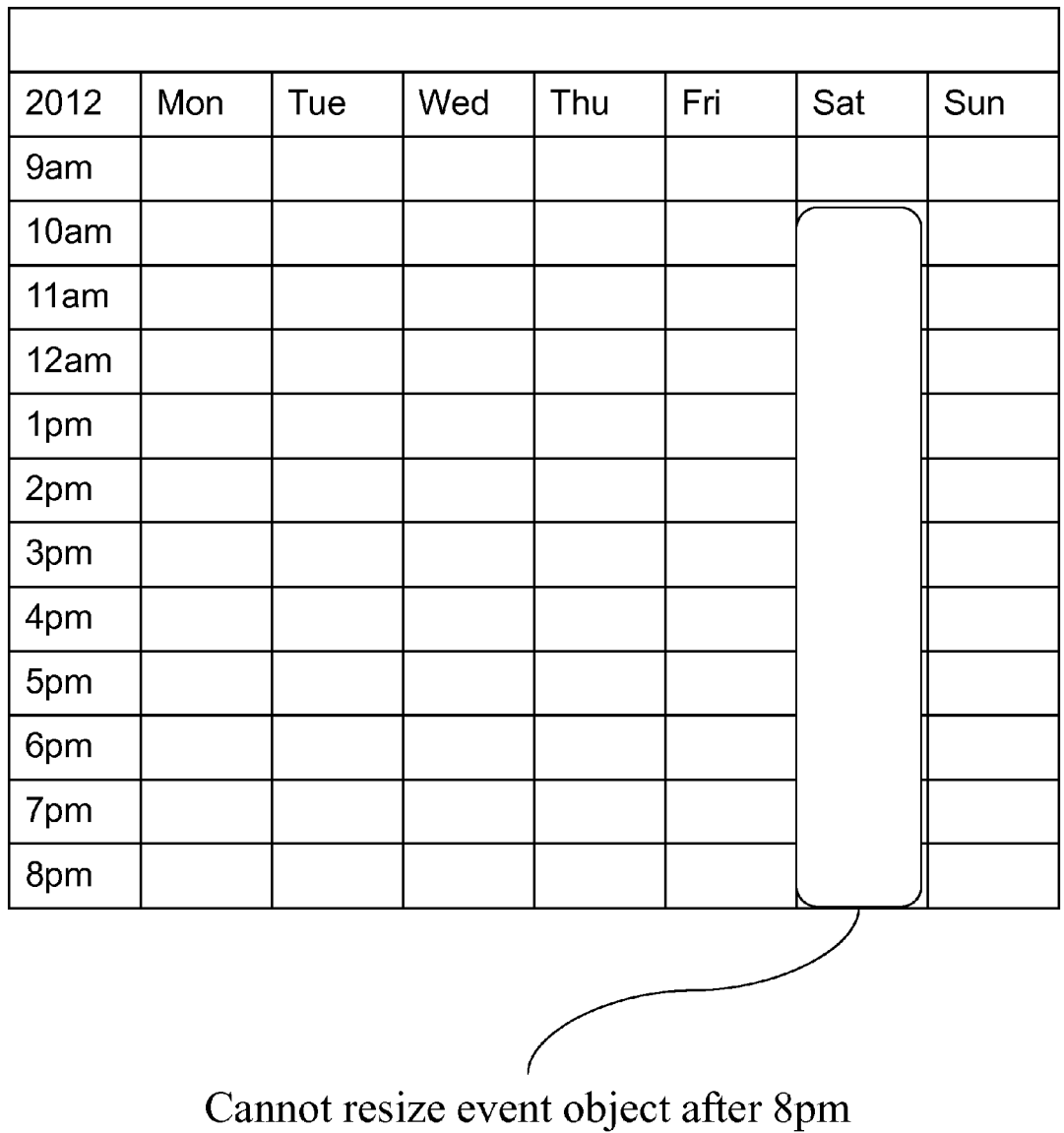

Referring to FIG. 5b, a user has dragged an edge of graphical appointment object over 8 pm but no further extension is possible due to an 8 pm boundary limitation of the calendar grid interface 500.

Figure 5C:
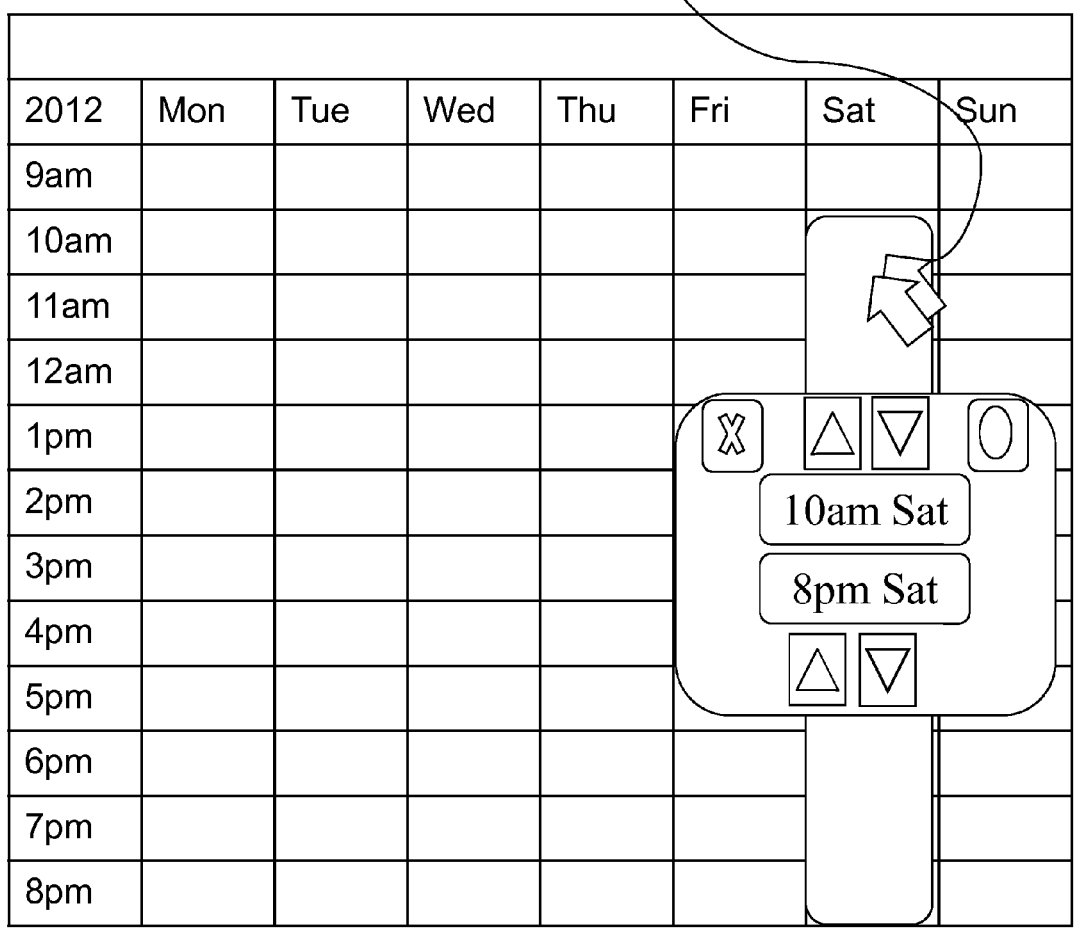

Referring to FIG. 5c, interactor edit mode has been selected with a double click on the event object and interactor widget 400 is displaced over graphical event object 502. In other embodiments there can be different methods of selecting interactor edit mode. In other embodiments, interactor widget 400 can be displayed anywhere in the graphical user interface.

Figure 5D:
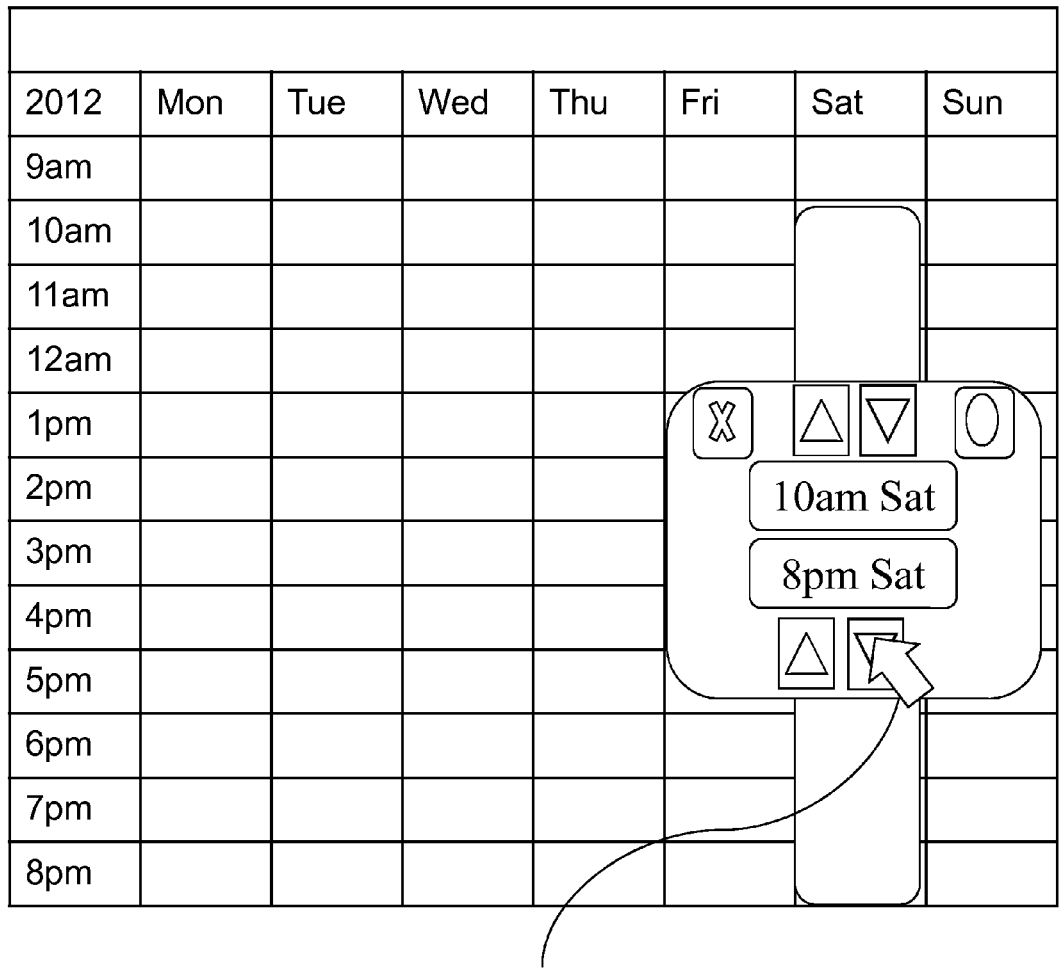

Referring to FIG. 5d, a user selects a sensitive area with the mouse cursor and adjusts the control. In other embodiments a mouse scroll wheel can be used with an appropriate control.

Figure 5E:
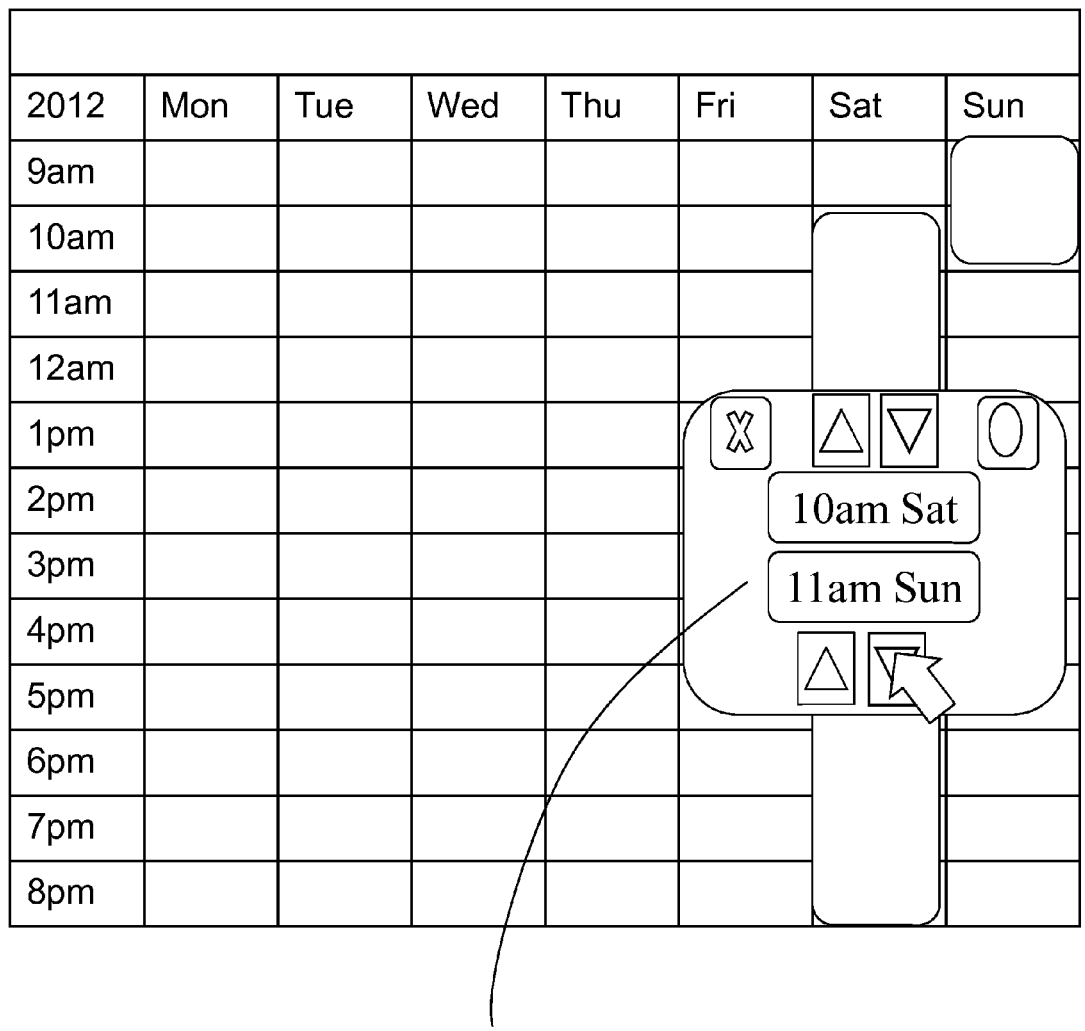

Referring to FIG. 5e, the user mouse cursor is shown over the control and the user has adjusted the control so that the event now lasts into the next day till 11 am.

Referring to FIG. 5f, the user mouse cursor is shown having selected the validate button and confirming the adjustment.

Thus, as described herein, in a first aspect of the invention there is provided a method for changing a graphical object property in a graphical user interface comprising: selecting a graphical object; identifying a property adjusted by a moveable edge of the graphical object wherein the property adjustment may be constrained by the graphical user interface; creating and displaying an additional graphical control for the identified property; and adjusting the property based on user interaction with the additional graphical control wherein the property is no longer constrained by the graphical user interface.

The method also encompasses the case when a graphical object is not so constrained by a user interface and a user wishes to use an additional graphical control.

The embodiments relate to a method for resizing a shape that is constrained or partially visible on a graphical screen. This implies providing a dedicated graphical interactor that allows control of properties associated with each edge of the shape.

Preferably the method is initiated by selecting from a context menu associated with the graphical object.

More preferably feedback for the property is displayed in association with the additional graphical control.

Still more preferably further comprising removing the additional graphical control after a user has confirmed the adjusted property value.

Most preferably the feedback for the property and the additional graphical control are displayed within an interactor widget. The interactor widget may be displayed on or near to or away from the graphical object depending on the context of the graphical object and the graphical user interface.

Advantageously, the additional graphical control is created when a user selects a constrained edge and requests an associated additional graphical control.

In the preferred embodiment, the type and number of additional graphical controls is statically linked to the type of graphical object but in other embodiments dynamic linking of graphical controls to edges and properties is envisaged.

More advantageously further comprising creating additional graphical controls and associating them respectively with a constrained edge and an edge opposite to the constrained edge.

Still more advantageously further comprising creating additional graphical controls for every edge of the graphical object.

Most advantageously further comprising resetting the properties if a user cancels the additional graphical control. A control can be provided for cancelling the additional graphical control or the additional graphical control is cancelled if the user control is focused on anything other than the additional control.

The embodiments have an effect on an application and graphical user interface that is external to processes carried on within the application or graphical user interface. The embodiments have an effect that operates at the machine level of the computer and not at the application level, the embodiments are independent of any application that is executing simultaneously. The embodiments have an effect that results in the computer being made to operate in a new way whereby a new interface is provided.

In a second aspect of the invention there is provided an interactor tool for changing a property of a graphical object in a graphical user interface comprising: an edge property detector for identifying a property controlled by a moveable edge of a selected graphical object wherein the property adjustment may be constrained if the movement of the edge is constrained by boundary conditions; and an additional graphical control that is created and displayed for the identified property and allows adjustment of the property based on user interaction of the additional graphical control wherein the property is no longer constrained by the boundary conditions and graphical object edge.

In a third aspect of the invention there is provided a computer program product for changing a property of a graphical object in a graphical user interface, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques.

The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

What is claimed is:

1. A method comprising:
    partially obscuring, by one or more processors, a graphical object on a graphical user interface with a pop-up window to create a partially obscured graphical object;
    identifying, by one or more processors, all properties that are associated with the graphical object;
    receiving, by one or more processors, a selection of the partially obscured graphical object;
    identifying, by one or more processors, a property adjusted by a moveable edge of the partially obscured graphical object, wherein a property adjustment of the property adjusted is initially constrained by the graphical user interface, and wherein the property is from said all properties that are associated with the graphical object;
    creating and displaying, by one or more processors, an additional graphical control for the identified property, wherein the additional graphical control is created in response to a user selecting a constrained edge and requesting the additional graphical control from a context menu associated with the partially obscured graphical object, wherein the additional graphical control includes a control icon that increases a size of the partially obscured graphical object beyond a viewable area of the graphical user interface, wherein the additional graphical control is incorporated into the pop-up window, and wherein the pop-up window includes a visual representation of a button that, when activated, expands the partially obscured graphical object in a direction in which the partially obscured graphical object is to extend beyond its visibly displayed portion;
    adjusting, by one or more processors, the identified property based on a user interaction with the additional graphical control, wherein the identified property is no longer constrained by the graphical user interface; and
    displaying, by one or more processors, feedback for the identified property being adjusted with the additional graphical control, wherein the additional graphical control causes the identified property of the partially obscured graphical object to be adjusted, and wherein the adjusted property is displayed in a separate field from the additional graphical control on the graphical user interface.

2. A computer program product for changing a graphical object property in a graphical user interface, the computer program product comprising a non-transitory computer readable storage medium having program code embodied therewith, the program code readable and executable by a processor to perform a method comprising:
    partially obscuring a graphical object on a graphical user interface with a pop-up window to create a partially obscured graphical object;
    identifying all properties that are associated with the graphical object;
    receiving a selection of the partially obscured graphical object;
    identifying a property adjusted by a moveable edge of the partially obscured graphical object, wherein a property adjustment of the property adjusted is initially constrained by the graphical user interface, and wherein the property is from said all properties that are associated with the graphical object;
    creating and displaying an additional graphical control for the identified property, wherein the additional graphical control is created in response to a user selecting a constrained edge and requesting the additional graphical control from a context menu associated with the partially obscured graphical object, wherein the additional graphical control includes a control icon that increases a size of the partially obscured graphical object beyond a viewable area of the graphical user interface, wherein the additional graphical control is incorporated into the pop-up window, and wherein the pop-up window includes a visual representation of a button that, when activated, expands the partially obscured graphical object in a direction in which the partially obscured graphical object is to extend beyond its visibly displayed portion;

adjusting the identified property based on a user interaction with the additional graphical control, wherein the identified property is no longer constrained by the graphical user interface; and displaying feedback for the identified property being adjusted with the additional graphical control, wherein the additional graphical control causes the identified property of the partially obscured graphical object to be adjusted, and wherein the adjusted property is displayed in a separate field from the additional graphical control on the graphical user interface.

3. The computer program product as in claim 2, wherein the method further comprises:

removing the additional graphical control in response to a user confirming a value of the adjusted identified property.

4. The computer program product as in claim 2, wherein the method further comprises:

creating a first additional graphical control and a second additional graphical control;

associating the first additional graphical control with a constrained edge on the partially obscured graphical object, wherein movement of the constrained edge on the partially obscured graphical object is constrained by boundary conditions of the graphical user interface; and associating the second additional graphical control with an edge opposite to the constrained edge on the partially obscured graphical object.

5. The computer program product as in claim 2, wherein the method further comprises:

resetting the identified property in response to a user cancelling the additional graphical control.

6. A system comprising:

a processor, a computer readable memory, and a computer readable storage medium;

first program instructions to partially obscure a graphical object on a graphical user interface with a pop-up window to create a partially obscured graphical object;

second program instructions to identify all properties that are associated with the graphical object;

third program instructions to receive a selection of the partially obscured graphical object;

fourth program instructions to identify a property adjusted by a moveable edge of the partially obscured graphical object, wherein a property adjustment of the property adjusted is initially constrained by the graphical user interface, and wherein the property is from said all properties that are associated with the graphical object;

fifth program instructions to create and display an additional graphical control for the identified property, wherein the additional graphical control is created in response to a user selecting a constrained edge and requesting the additional graphical control from a context menu associated with the partially obscured graphical object, wherein the additional graphical control includes a control icon that increases a size of the partially obscured graphical object beyond a viewable area of the graphical user interface, wherein the additional graphical control is incorporated into the pop-up window, and wherein the pop-up window includes a visual representation of a button that, when activated, expands the partially obscured graphical object in a direction in which the partially obscured graphical object is to extend beyond its visibly displayed portion;

sixth program instructions to adjust the identified property based on a user interaction with the additional graphical control, wherein the identified property is no longer constrained by the graphical user interface; and seventh program instructions to display feedback for the identified property being adjusted with the additional graphical control, wherein the additional graphical control causes the identified property of the partially obscured graphical object to be adjusted, and wherein the adjusted property is displayed in a separate field from the additional graphical control on the graphical user interface; and wherein the first, second, third, fourth, fifth, sixth, and seventh program instructions are stored on the computer readable storage media, and wherein the program instructions are executed by the processor via the computer readable memory.

7. The system as in claim 6, further comprising:

eighth program instructions to remove the additional graphical control in response to the user confirming a value of the adjusted identified property; and wherein the eighth program instructions are stored on the computer readable storage media, and wherein the program instructions are executed by the processor via the computer readable memory.

8. The system as in claim 6, further comprising:

eighth program instructions to create a first additional graphical control and a second additional graphical control;

ninth program instructions to associate the first additional graphical control with a constrained edge on the partially obscured graphical object, wherein movement of the constrained edge on the partially obscured graphical object is constrained by boundary conditions of the graphical user interface; and tenth program instructions to associate the second additional graphical control with an edge opposite to the constrained edge on the partially obscured graphical object; and wherein the seventh, eighth, ninth, and tenth program instructions are stored on the computer readable storage media, and wherein the program instructions are executed by the processor via the computer readable memory.

9. The computer program product of claim 2, wherein the pop-up window comprises a cancel button for resetting any adjustments to properties of the partially obscured graphical object back to original values of the properties of the partially obscured graphical object, wherein the pop-up window further comprises a validate button for confirming any adjustments to the properties of the partially obscured graphical object, wherein the pop-up window further comprises interactor sensitive area controls that include user-selectable arrows for increasing and decreasing time frames of the partially obscured graphical object, and wherein the pop-up window further comprises interactor feedback controls for displaying updated text representations of the time frames of the partially obscured graphical object.

10. The computer program product of claim 2, further comprising:
   adjusting said all properties that are associated with the graphical object based on the user interaction with the additional graphical control.

11. The method of claim 1, wherein operations shown in claim 1 are performed at a machine level of a computer that is independent of an application that generated the graphical user interface.

\* \* \* \* \*